US008917735B2

(12) United States Patent
Shieh

(10) Patent No.: US 8,917,735 B2
(45) Date of Patent: Dec. 23, 2014

(54) ARRANGEMENT FOR CONTROLLING ACCESS TO DATA NETWORK

(75) Inventor: Hugh Shieh, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 516 days.

(21) Appl. No.: 12/820,541

(22) Filed: Jun. 22, 2010

(65) Prior Publication Data

US 2011/0310863 A1    Dec. 22, 2011

(51) Int. Cl.
*H04L 12/66* (2006.01)
*H04L 29/12* (2006.01)

(52) U.S. Cl.
CPC .................................. *H04L 61/2517* (2013.01)
USPC ...................................... 370/401; 455/553.1

(58) Field of Classification Search
USPC .............. 370/310, 315, 328, 389, 392, 395.5, 370/401, 431, 463, 464, 465, 466; 455/405, 455/407, 462, 550.1, 553.1, 554.2, 556.1, 455/556.2, 557
See application file for complete search history.

(56) References Cited

U.S. PATENT DOCUMENTS

| | | | | |
|---|---|---|---|---|
| 7,606,600 | B2 * | 10/2009 | Park ............................... | 455/574 |
| 7,672,695 | B1 * | 3/2010 | Rainnie et al. ................. | 455/574 |
| 7,720,021 | B1 * | 5/2010 | Zhou et al. ..................... | 370/315 |
| 2004/0109457 | A1 * | 6/2004 | Johnson et al. ................ | 370/401 |
| 2004/0114628 | A1 * | 6/2004 | Haddad et al. ................. | 370/468 |
| 2004/0229621 | A1 * | 11/2004 | Misra ............................. | 455/445 |
| 2005/0078620 | A1 * | 4/2005 | Balachandran et al. ....... | 370/313 |
| 2005/0089048 | A1 * | 4/2005 | Chittenden et al. ...... | 370/395.54 |
| 2005/0152287 | A1 * | 7/2005 | Yokomitsu et al. ........... | 370/255 |
| 2005/0265252 | A1 * | 12/2005 | Banerjee et al. .............. | 370/252 |
| 2006/0209794 | A1 * | 9/2006 | Bae et al. ....................... | 370/352 |
| 2006/0221824 | A1 * | 10/2006 | Anzai ............................ | 370/229 |
| 2007/0037563 | A1 * | 2/2007 | Yang et al. ..................... | 455/418 |
| 2007/0116051 | A1 * | 5/2007 | Chen ............................. | 370/469 |
| 2007/0214232 | A1 * | 9/2007 | Belimpasakis et al. ....... | 709/217 |
| 2007/0268515 | A1 * | 11/2007 | Freund et al. ................. | 358/1.15 |
| 2009/0005005 | A1 * | 1/2009 | Forstall et al. ................. | 455/411 |
| 2009/0168719 | A1 * | 7/2009 | Mercurio ....................... | 370/331 |
| 2009/0264154 | A1 * | 10/2009 | Rofougaran ................... | 455/557 |
| 2010/0107225 | A1 * | 4/2010 | Spencer et al. .................... | 726/4 |
| 2010/0120439 | A1 * | 5/2010 | Hashimoto et al. ........... | 455/445 |
| 2010/0296441 | A1 * | 11/2010 | Barkan .......................... | 370/328 |

FOREIGN PATENT DOCUMENTS

WO    WO 2007096884 A3 *  8/2007

* cited by examiner

*Primary Examiner* — Curtis A Alia
(74) *Attorney, Agent, or Firm* — Abel Law Group, LLP

(57) ABSTRACT

A soft AP module that is installed in the subscriber device is adapted to assign preselected ports numbers as part of its network address translation process. Those port numbers are registered to be used solely for this purpose, port numbers that are registered to applications that are seldomly used, or port numbers in the range 49152-65535. One or more modules in the service provider's facilities analyze the packets that pass through the service provider's facilities. Each module detects the aforementioned predetermined port numbers in the analyzed packets and thus identifies the network load that is attributed to devices the employ the W²LANs.

17 Claims, 2 Drawing Sheets

ARRANGEMENT FOR CONTROLLING ACCESS TO DATA NETWORK

BACKGROUND

This relates to devices and methods for interfacing with a data network.

In the Plain Old Telephone Service (POTS) environment the service provider (which most often is also the network provider) allocates network facilities to users based on the service to which the users subscribe, and some of those allocated facilities are dedicated to the subscriber (e.g., the physical line from the subscriber's house). Users who want a greater bandwidth have facilities allocated to them that provide the greater bandwidth and, correspondingly, pay more for the service. The implicit agreement is that the user can take advantage of the full subscribed bandwidth (or other enhanced service features) at any time, sporadically or continuously.

The subscriptions paradigm in cellular telephony is now substantially the same as in POTS. That is, subscribers are charged a monthly rate that is a function of the network features and capabilities that the subscribers might use. One difference, however, is that the features and capabilities that a subscriber of a cellular device may enjoy are typically very closely associated with the features and capabilities that the cellular device provides. Consequently, cellular service providers often offer subscription packages that are tied to the type of cellular device that the subscriber purchases with a subscription. Another difference is that the cellular devices are designed to the service provider's specification.

In a closely parallel field, computers communicate across a data network, e.g., the Internet, where communication takes place in a connectionless manner through addressed packets. A packet comprises header fields that are followed by an information field. The header fields follow a predetermined arrangement, which allows operation in accordance with prescribed protocols; for example, the Internet Protocol (IP) suite. The TCP and UDP protocols in the transport layer of the Internet Protocol suite (but also other protocols) use a numerical identifier for the data structures of the endpoints for host-to-host communications. This identifier is known as the port number. The Internet Assigned Numbers Authority (IANA) is responsible for maintaining the official assignments of port numbers for specific uses.

In a typical arrangement, a computer is connected to a modem which, through a coax cable, optical fiber, or phone lines, is connected to an Internet Service Provider (ISP), and from the ISP to the data network. The prevailing data network nowadays is the Internet. A router that is interposed between the computer and the modem allows a plurality of computers to connect to the router, to inter-communicate, and through the modem to connect to the Internet. Initially, the connection of the computers to the router was through physical wires, forming a wired local area network LAN, but more recently the routers have incorporated wireless access points (APs), allowing the LANs to be wireless. Consequently, there are many locations throughout the world where, for a small charge or for free, computers can connect to the Internet through an AP and a router. These are often referred to as hot spots.

More recently, the same connectivity to the internet has been achieved in cell phones. That is, via a base station and an ISP cell phones can connect to the Internet. With the development of earpiece and microphone connectivity to the cell phone via the Bluetooth protocol, an even more recent development is software that is installed in the cell phone and which implements an AP, router and network address translation (NAT) functions (collectively herein, "soft AP"). This software creates a hot spot that accompanies the cell phone.

Use of the soft AP presents a problem to the service provider in that a cell phone that was expected to present a certain load on the link from the cell phone to the base station, and a certain load on the network, is now in position to load the aforementioned link and network much more heavily. That, in turn, affects what the network provider must do in order to assure that the expected level of service is still available to users, and it also nullifies the assumptions on which service subscriptions fees are based. Consequently, it is important for the service provider to know how much usage takes place of the LAN created by the soft AP ($W^2LAN$). To that end, it is desirable to provide a scheme by which data traffic that uses a shared device can be identified and controlled, if desired.

SUMMARY

An advance in the art is achieved by a soft AP module that is installed in the subscriber device and which is adapted to assign preselected ports numbers. Advantageously, those are port numbers that are registered to be used solely for this purpose, port numbers that are registered to applications that are seldomly used, or port numbers in the range 49152-65535.

One or more modules in the service provider's facilities (such as in the provider's base stations) analyze the packets that pass through the service provider's facilities. Each module detects the aforementioned predetermined port numbers in the analyzed packets and thus identifies the network load that is attributed to devices the employ the $W^2LANs$.

DETAILED DESCRIPTION

Figure 1:
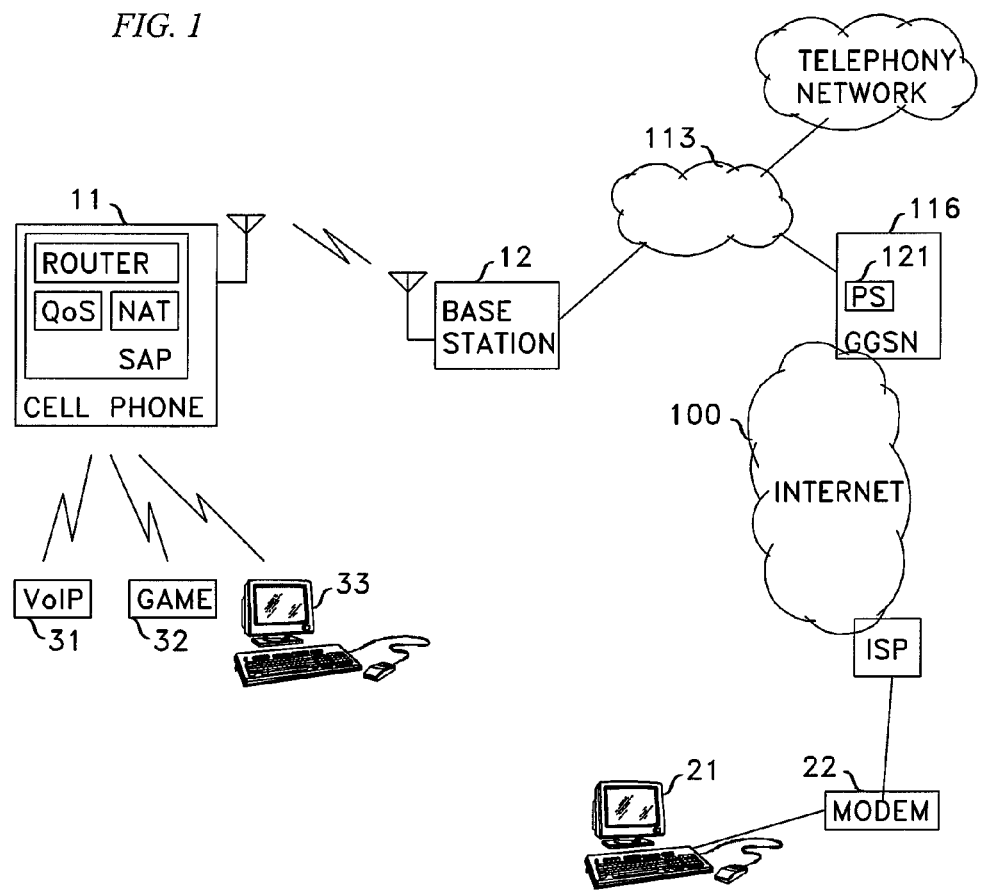
FIG. 1 is an arrangement in accord with the principles disclosed herein.

FIG. 1 depicts an arrangement where a cell phone 11 connects to base station 12, from which it connects to network 113 of the wireless provider of cell phone 11. This network includes the GPRS network that provides connection to a telephony network and to the packet network 100 through an element that is typically referred to as the Gateway GPRS Support Node, or GGSN. Not dissimilarly, device 21 connects to data network 100 through modem 22 and an ISP router/switch.

Cell phone 11 in the FIG. 1 arrangement includes a soft AP that supports a plurality of devices that can intercommunicate and that can also gain access to network 100 (via base station 12, network 113, and GGSN 116). One such device is Voice over IP (VoIP) telephone 31.

To provide for this connectivity, the soft AP that creates the $W^2LAN$ establishes a LAN address for each device, and the router that is included in the soft AP maintains a record of the devices and their LAN addresses.

VoIP phone 31 gains access to network 100 via its "home ISP" but, of course, it has to first reach that ISP and register with it. To that end, on a regular basis VoIP phone 31 sends registration packets that are addressed to its home ISP. The source address of those packets is the LAN address that cell phone 11 assigned to VoIP phone 31. The soft AP recognizes the registration packet as one that contains a destination address of network 100 and proceeds to alter the packet and to then send it to network 100. In altering the packet, the soft AP replaces the source address of the packet with its own network 100 source address (this activity is often referred to as network address translation, or NAT), and adds a port number to the packet. In the prior art, the added port number is arbitrarily selected. The soft AP also stores the association of the phone 31 LAN address and the selected port number.

When the service provider of telephone 31 subsequently wishes to reach VoIP phone 31, it sends a packet with the network address of cell phone 11 and the port number found in the packet that it received from cell phone 11. The soft AP module within cell phone 11 recognizes the port number as the one assigned to VoIP phone 31, replaces its network address in the received packet with the LAN address of VoIP phone 31, and forwards the packet to the LAN, through which the packet arrives at VoIP phone 31.

As indicated above, the FIG. 1 arrangement, where cell phone 11 uses the conventional soft AP, presents a problem to the network provider, which makes it important for the network provider to know how much data pertains to devices that enjoy network connectivity via the $W^2LAN$, and to be properly compensated for use of its network.

Figure 2:
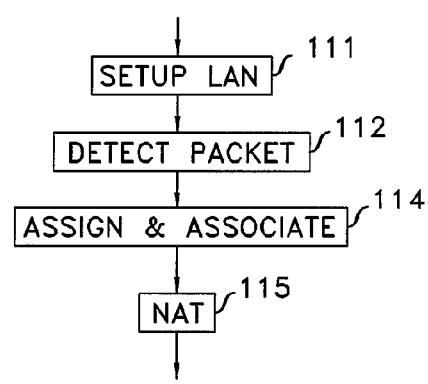
FIG. 2 presents a flow chart of a process in cell phone 11 of the FIG. 1 arrangement.

Fortunately, the entity that provides the wireless service for cell phone 11 and secures access to data network 100 also provides the physical cell phone 11. In accord with the principles of this invention, therefore, cell phone 11 is modified to employ a soft AP with an enhanced port selection process, depicted in FIG. 2, where step 111 establishes a membership for all devices that wish to employ the LAN of cell phone 11.

In accord with one aspect of the disclosure herein, the preselected numbers are maintained in a read-only memory (ROM) within cell phone 11, or are developed algorithmically.

In accord with another aspect of the disclosure herein, one or more elements that are situated upstream of cell phone 11 (i.e., towards network 100) is augmented with a packet sniffer module 121 that determines the port numbers of passing packets. The elements may be situated at points that are still under control of the wireless service provider, such as base station 12 or GGSN 116. In the FIG. 1 embodiment, illustratively, module 121 is within GGSN element 116.

Packets that carry the port numbers that are preselected for use by the soft AP modules of wireless devices such as cell phone 11 ($W^2LAN$ packets) are processed in module 121 in accord with whatever algorithm the service provider wishes to carry out. Most simply, module 121 identifies the percentage of $W^2LAN$ AP packets relative to the total number of packets that module 121 sniffs. A finer level of processing is achieved by computing such an average on a device by device basis (e.g., for cell pone 11).

Following the processing, perhaps after accumulating data over a significant time interval, the service provider may determine that it needs additional resources to be added to the network, or change the working parameters of, for example, base stations 12. Alternatively, the service provider may decide that the user of cell phone 11 exceeded a certain level of usage and, therefore, the service provider may charge the user of cell phone 11 a premium.

Packets that arrive via the $W^2LAN$ can originate from different types of devices. In the FIG. 1 illustrative example, device 31 is a VoIP telephone, device 32 is a game, and device 33 is a computer. It may be noted that the data flow burden that computer 33 is likely to present to network 100 is significantly greater than the data flow burden by VoIP phone 31 is likely to present. It is, therefore, beneficial if the service provider were able to distinguish data flows that originate from different types of devices. Alternatively the service provider might find it beneficial to distinguish data flows from different types of applications—i.e., where applications with different data load characteristics—, where some devices may execute different types of applications. This is particularly beneficial if the service provider wishes to have a cost structure that is more sensitive to the manner in which cell phone 11 takes advantage of the network connectivity that the service provider makes available, or simply to the number of devices that use the $W^2LAN$ of cell phone 11, or to the number and types of devices that use the $W^2LAN$ of cell phone 11.

To that end, in accord with another aspect of the disclosure herein the preselected port numbers are divided into distinct groups, and numbers from a given group are assigned to devices of a particular type and/or to applications of a particular type. Illustratively when port numbers are assigned solely based on devices types, VoIP phones are assigned port numbers that correspond to 0 in modulo 8 representation of the port number (numbers that when divided by 8 leave a remainder of 0), computers are assigned port numbers that correspond to 1 in modulo 8 representation of the port number, games are assigned port numbers that correspond to 2 modulo 8 representation of the port number, etc. A total of 8 different types are thus permitted.

Correspondingly, module 121 is sensitive not only to whether the port number of incoming packets belong to the preselected set of port numbers but also to the subset of port numbers to which the port number belongs.

As indicated above, another approach for the soft AP assigning port numbers is based on the type of application that a connected device wishes to run and the QoS class requested by the application. Each application can be mapped to a particular QoS class, e.g., Background, Best Effect, Voice, and Video. The soft AP in cell phone 11 can then assign a NAT source port number according to the QoS, e.g., 0 in modulo 8 for default QoS class, 1 in modulo 8 for Background QoS, 2 in modulo 8 for Best Effect QoS class, 3 in modulo 8 for Voice QoS class, and 4 in modulo 8 for Video QoS class, etc. If there are two or more applications with the same QoS class (e.g., Voice QoS class) active at the same time to the same destination host, then the next higher level port number are assigned, e.g., next higher level of 3 in modulo 8 for Voice QoS class.

Figure 3:
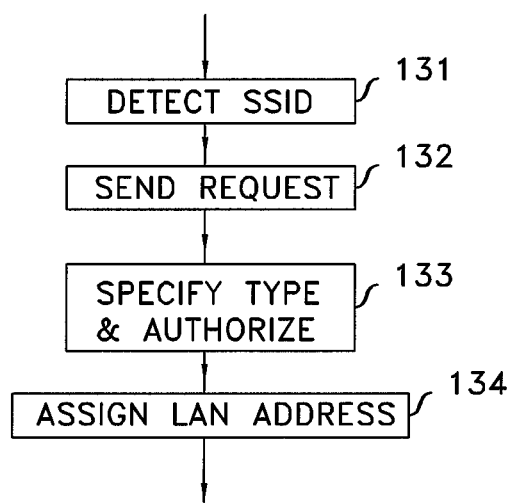
FIG. 3 presents a flow chart of a process for establishing the LAN created by the AP in cell phone 11 of the FIG. 1 arrangement.

Another approach for the soft AP assigning port numbers based on the type of device that is connected to the $W^2LAN$, is to modify the conventional process for devices joining the $W^2LAN$. An illustrative embodiment of the enhanced process for joining the $W^2LAN$ is depicted in FIG. 3.

The soft AP broadcasts an SSID (step 131). A device that receives the SSID and wishes to join the network sends a request packet (step 132) that contains the MAC ID of the device. Soft AP detects the MAC ID and presents a query on the cell phone's screen, asking the user of cell phone 11 to identify the device type and to confirm that the user of cell phone 11 agrees to accept the device as a member of its $W^2LAN$ (step 133). The specification of the device type determines the category of the port address that the soft AP assigns to the device when that device seeks to send a packet to the Internet, a LAN address is assigned to the device, the device category and the LAN address are stored in the soft AP, and a response message is sent to the device to inform it of its assigned LAN address (step 134).

Requiring the user of cell phone 11 to decide whether to accept a particular device into its LAN is beneficial to the user because it enables the user to prevent an interloper device from using the W²LAN of cell phone 11. Requiring the user to identify the type of the device that is accepted into the W²LAN is beneficial to the service provider.

To the extent that the user perceives that correctly identifying device types is to the user's disadvantage that raises the issue of the user purposely misidentifying the device types. The temptation to misidentify the device type would arise, for example, if the service provider sets up a cost structure that demands greater payment for network access by devices that have a high data flow and lower payment for network access by devices that have a low data flow.

To forestall such misidentifying, the soft AP includes a QoS module that includes a queue for each class of service. The number of packets that each queue is permitted to send to network 100, on the average, is a function of the limit agreed to between the subscriber of cell phone 11 and the service provider, and the other devices that wish to send packets via cell phone 11 to base station 12. The contention among the devices of the W²LAN of cell phone 11 can be managed, for example, with a pseudorandom number generator in a lottery style. That is, specific numbers are assigned to different device types and a number that is created by a pseudorandom number generator is the lottery number that decides which device sends packets. Illustratively, if there are three devices on the W²LAN and the data flow rates of the device types are 1, 2, and 8, a pseudorandom number that is represented in modulo N, where N is the total flow rates of the active devices (in this case, 1+2+8=11) is used to decide which device sends data. Thus, when the number generator creates number 0 (when expressed in modulo 11), the first device is permitted to send data. When the number generator creates numbers 1 or 2 (when expressed in modulo 11), the second device is permitted to send data. When the number generator creates numbers 3 through 11 (when expressed in modulo 11), the third device is permitted to send data.

The above disclosed the principles of this invention but it should be understood that various modifications may suggest themselves to a person of ordinary skill in the art without departing from the spirit and scope of this invention. For example, the analysis that is disclosed above as being performed in the GGSN can be carried out in other elements of the service provider, such as in the ISP router/switch. Also, the number of devices that can be connected to the W²LAN can be limited, for example, to 8.

The invention claimed is:

1. An apparatus comprising:
 a wireless telephone with capability to connect to a data network, the wireless telephone including,
 an antenna; and
 a module configured to implement an access point (AP), a router, and network address translation to thereby create a wireless local area network which, when receiving a packet from a device coupled to said wireless local area network that requests connection to a specified destination address on the data network, replaces a local area network source address of said packet with a network address of said router and inserts a port number in said packet, wherein said module selects said port number from a set of pre-chosen port numbers according to a device type of said device;
 wherein devices of a first type on said wireless local area network are assigned respective first port numbers by said wireless telephone, said first port numbers being selected such that a modulo n representation of each of said first port numbers is a first number, n being an integer, and wherein devices of a second type are assigned respective other port numbers by said wireless telephone, said other port numbers being selected such that said modulo n representation of each of said other port numbers is a second number.

2. The apparatus of claim 1 where said data network is the Internet.

3. The apparatus of claim 1 where said module that selects said port number makes the selection independently of identity of an application that said requesting device is executing.

4. The apparatus of claim 1 where said preselected numbers are port numbers that are registered with an Internet Assigned Numbers Authority for use in wireless local area network network address translations.

5. The apparatus of claim 1 where said preselected numbers are between 49152 and 65535.

6. The apparatus of claim 1 where said preselected numbers are port numbers that are registered with an Internet Assigned Numbers Authority for use by applications that flow through said wireless local area network less than 1% of the time.

7. The apparatus of claim 1 where said telephone includes another module for enabling a user of said telephone to specify a type for a device that seeks connection to said wireless local area network.

8. The apparatus of claim 7 further including a quality of service (QoS) module that controls data flow rates of devices connected to said wireless local area network.

9. The apparatus of claim 1 where said telephone includes another module for enabling a user of said telephone to allow or disallow a connection to said wireless local area network of a device that seeks said connection.

10. The apparatus of claim 1 where said telephone includes another module for enabling a user of said telephone to allow access by a device that seeks connection to said wireless local area network, and to specify a type for said device.

11. The apparatus of claim 1 further comprising an element upstream of said module that includes a packet sniffer that:
 identifies a port number of incoming packets to thereby obtain data pertaining to network load; and
 processes said data to determine which of said incoming packets are from said wireless local area network according said port number.

12. The apparatus of claim 11 where said element is between said module and said data network.

13. The apparatus of claim 11 where said processing computes a percentage of packets incoming to said element from said wireless local area network relative to other packets arriving at said element.

14. The apparatus of claim 11 where said processing focuses on said wireless telephone.

15. The apparatus of claim 1 wherein said first number is 0, said second number is 1, and n is 8.

16. A method for use with a wireless telephone with capability to connect to a data network, said wireless telephone implementing an access point (AP) function, router, and network address translation functions and thereby creating a wireless local area network, the method comprising:
 receiving a packet from a device coupled to said wireless local area network, the packet associated with a request for a connection to a destination address on the data network;
 inserting a port number in said packet from a set of port numbers, the port number being selected according to a device type of said device;
 said wireless telephone assigning devices of a first type on said wireless local area network respective first port numbers, said first port numbers being selected such that a modulo n representation of each of said first port numbers is a first number, n being an integer; and said wireless telephone assigning devices of a second type other port numbers, said other port numbers being selected such that said modulo n representation of each of said other port numbers is a second number.

17. A method for use with a wireless telephone with capability to connect to a data network, said wireless telephone implementing an access point (AP) function, router, and network address translation functions and thereby creating a wireless local area network, the method comprising:

receiving a packet from a connected device coupled to said wireless local area network, the packet associated with a request for a connection to a destination address on the data network;

inserting a port number in said packet, the port number being selected according to, at least in part, a quality of service class requested by an application of the connected device;

said wireless telephone assigning a first quality of service class a first port number, said first port number being selected such that a modulo n representation of said first port number is a first number, n being an integer; and said wireless telephone assigning a second quality of service class another port number, said other port number being selected such that said modulo n representation of said other port number is a second number.

* * * * *